(12) United States Patent
Cao et al.

(10) Patent No.: US 11,914,982 B2
(45) Date of Patent: *Feb. 27, 2024

(54) DEPLOYMENT AND CONFIGURATION OF AN EDGE SITE BASED ON DECLARATIVE INTENTS INDICATIVE OF A USE CASE

(71) Applicant: Hewlett Packard Enterprise Development LP, Spring, TX (US)

(72) Inventors: Lianjie Cao, Milpitas, CA (US); Anu Mercian, Santa Clara, CA (US); Diman Zad Tootaghaj, Milpitas, CA (US); Faraz Ahmed, Milpitas, CA (US); Puneet Sharma, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,287

(22) Filed: Jun. 2, 2023

(65) Prior Publication Data

US 2023/0325166 A1    Oct. 12, 2023

Related U.S. Application Data

(63) Continuation of application No. 17/236,884, filed on Apr. 21, 2021, now Pat. No. 11,698,780.

(51) Int. Cl.
*G06F 8/60* (2018.01)
*G06F 8/61* (2018.01)
(Continued)

(52) U.S. Cl.
CPC .............. *G06F 8/61* (2013.01); *G06F 40/30* (2020.01); *H04L 67/12* (2013.01)

(58) Field of Classification Search
CPC ...................................................... G06F 8/60
See application file for complete search history.

(56) References Cited

U.S. PATENT DOCUMENTS 8,413,119 B2    4/2013  Bierman et al.
10,893,116 B1   1/2021  Koehler et al.
(Continued)

FOREIGN PATENT DOCUMENTS

WO    2019/174449 A1    9/2019
WO    2019/233273 A1    12/2019
WO    2022/096136 A1    5/2022

OTHER PUBLICATIONS

1. Marques-Silva et al., "Chapter 4: Conflict-Driven Clause Learning SAT Solvers," 2008, pp. 127-149, IOS Press.
(Continued)

*Primary Examiner* — Jae U Jeon
(74) *Attorney, Agent, or Firm* — Slater Matsil, LLP

(57) ABSTRACT

Embodiments described herein are generally directed to an edge-CaaS (eCaaS) framework for providing life-cycle management of containerized applications on the edge. According to an example, declarative intents are received indicative of a use case for which a cluster of a container orchestration platform is to be deployed within an edge site that is to be created based on infrastructure associated with a private network. A deployment template is created by performing intent translation on the declarative intents and based on a set of constraints. The deployment template identifies the container orchestration platform selected by the intent translation. The deployment template is then executed to deploy and configure the edge site, including provisioning and configuring the infrastructure, installing the container orchestration platform on the infrastructure, configuring the cluster within the container orchestration platform, and deploying a containerized application or portion thereof on the cluster.

19 Claims, 9 Drawing Sheets

(51) Int. Cl.
    *G06F 40/30*     (2020.01)
    *H04L 67/12*     (2022.01)

(56) References Cited

U.S. PATENT DOCUMENTS

| | | | |
|---|---|---|---|
| 2002/0029194 A1 | 3/2002 | Lewis et al. | |
| 2018/0233141 A1* | 8/2018 | Solomon | G06T 7/70 |
| 2020/0314145 A1 | 10/2020 | Bolignano et al. | |
| 2022/0086846 A1* | 3/2022 | Sharma | H04W 72/543 |
| 2022/0276842 A1* | 9/2022 | Delpech de Frayssinet | G06F 8/447 |

OTHER PUBLICATIONS

C. Xing et al., "IoT Edge Working Group Deep Dive," Dec. 13, 2018, 29 pages.

Hewlett Packard Enterprise, "OT Link Platform Deployment," 2021, 3 pages, Retrieved from the Internet on Apr. 19, 2021 at URL: techlibrary.hpe.com/docs/otlink-wo/OT%20Link%20Platform-Deployment.html.

K3s Project Authors, "Lightweight Kubernetes," 2020, 4 pages, Retrieved from the Internet on Apr. 19, 2021 at URL: https://k3s.io.

KubeEdge Project Authors, "KubeEdge," 2020, 4 pages, Retrieved from the Internet on Apr. 19, 2021 at URL: docs.kubeedge.io/en/.

Kubernetes Authors, "Extending the Kubernetes API," 2021, 8 pages, Retrieved from the Internet on Apr. 19, 2021 at URL: kubernetes.io/docs/concepts/extend-kubernetes/api-extension/custom-resources/.

Kuljeet Kaur et al., "Container-as-a-Service at the Edge: Trade-Off Between Energy Efficiency and Service Availability at Fog Nano Data Centers," Jun. 2017, pp. 48-56, IEEE Wireless Communications.

L. Cao et al., "eCaaS: A Management Framework of Edge Container as a Service for Business Workload," Abstract, EdgeSys '21: Proceedings of the 4th International Workshop on Edge Systems, Analytics and Networking, Apr. 2021, 4 pages, Apr. 2021, Retrieved from the Internet on Apr. 21, 2021 at URL: dl.acm.org/doi/10.1145/3434770.3459741.

M. Davis and H. Putnam, "A Computing Procedure for Quantification Theory," 1959, pp. 201-215, AF 49(638)-527.

PTC Inc., "The Power of Now: thingworx," 2020, 12 pages.

The Linux Foundation, "The Linux Foundation Launches New LF Edge to Establish a Unified Open Source Framework or the Edge," Jan. 24, 2019, 7 pages, Retrieved from the Internet on Apr. 19, 2021 at URL: linuxfoundation.org/en/press-release/the-linux-foundation-launches-new-lf-edge-to-establish-a-unified-open-source-framework-for-the-edge/.

Tom Goethals et al., "Near Real-Time Optimization of Fog Service Placement for Responsive Edge Computing," 2020, 17 pages, Journal of Cloud Computing: Advances, Systems.

Wikipedia, "Satisfiability Modulo Theories", Mar. 25, 2021, 10 pages, Retrieved from the Internet on Apr. 19, 2021 at URL: en.wikipedia.org/wiki/Satisfiability_modulo_theories.

\* cited by examiner $(O_{kubel}(ke) \wedge \neg O_{csi}(DF)) \vee (O_{csi}(DF) \wedge \neg O_{kubel}(ke))$
$\vee (O_{csi}(DF) \wedge O_{kubel}(K3)) \vee (O_{csi}(DF) \wedge O_{kubel}(K8))$

310

$(O_{kubel}(K3) \wedge \neg I_{ksl}(high) \wedge I_{ksA} \wedge I_{ksLg}(ext))$
$\vee (O_{kubel}(K3) \wedge \neg I_{ksl}(high) \wedge \neg I_{ksA}) \vee (O_{kubel}(K8) \wedge I_{ksl}(high) \wedge I_{ksA})$

$((\neg I_{ksl}(r) \wedge (I_{ksl}(hc) \vee I_{ksl}(m))) \wedge O_{kubel}(ke))$
$\vee ((I_{ksl}(r) \wedge \neg I_{ksl}(hc) \wedge \neg I_{ksl}(m)) \wedge O_{kubel}(K3))$
$\vee ((\neg I_{ksl}(r) \wedge \neg I_{ksl}(hc) \wedge \neg I_{ksl}(m)) \wedge (O_{kubel}(K8) \wedge O_{kubel}(K3) \wedge O_{kubel}(ke)))$

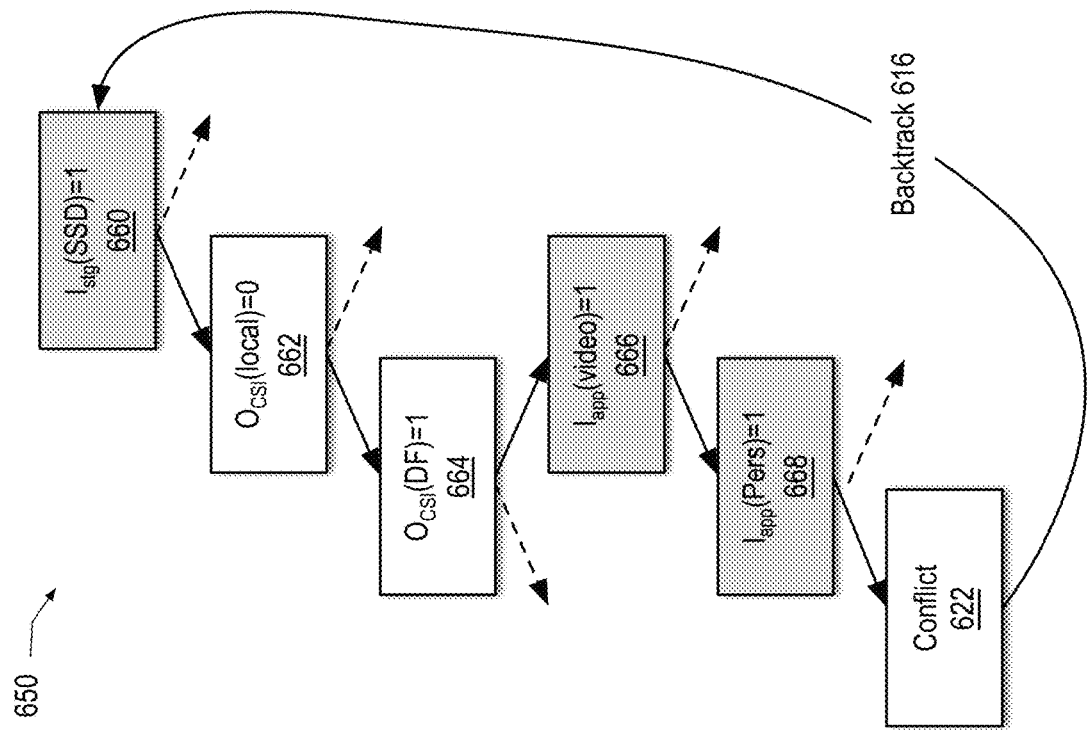
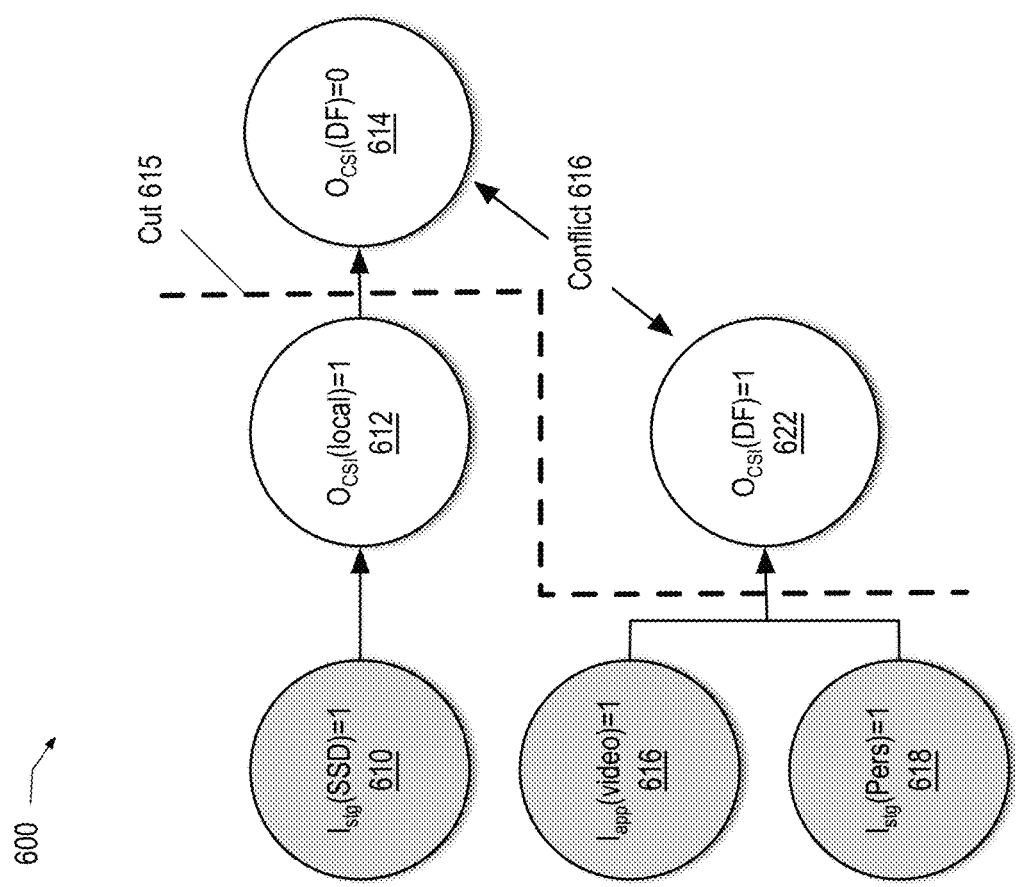
FIG. 6B
FIG. 6A

DEPLOYMENT AND CONFIGURATION OF AN EDGE SITE BASED ON DECLARATIVE INTENTS INDICATIVE OF A USE CASE

CROSS-REFERENCE TO RELATED APPLICATIONS

This application is a continuation application of and claims priority to application Ser. No. 17/236,884, filed on Apr. 21, 2021, the contents of which are hereby incorporated by reference in their entireties.

BACKGROUND

Container-based technologies are affecting how enterprise workload/applications can be developed, deployed, and managed. Public cloud providers offer managed container as a service (CaaS) to help customers focus on developing the business logic of their applications rather than maintaining the underlying infrastructure and container orchestration platform.

BRIEF DESCRIPTION OF THE DRAWINGS

Embodiments described here are illustrated by way of example, and not by way of limitation, in the figures of the accompanying drawings in which like reference numerals refer to similar elements.

FIGS. 3A and 3B depict examples of predicates in first-order logic format that may be used to model various design choices for an edge site in accordance with an example embodiment.

FIG. 6A shows a concrete example of an implication graph that may be used in connection with identifying conflicts in user inputs during the intent conflict detection/resolution of FIG. 5.

FIG. 6B shows a concrete example of a decision tree that may be used in connection with identifying conflicts in user inputs during the intent conflict detection/resolution of FIG. 5.

DETAILED DESCRIPTION

Figure 1:
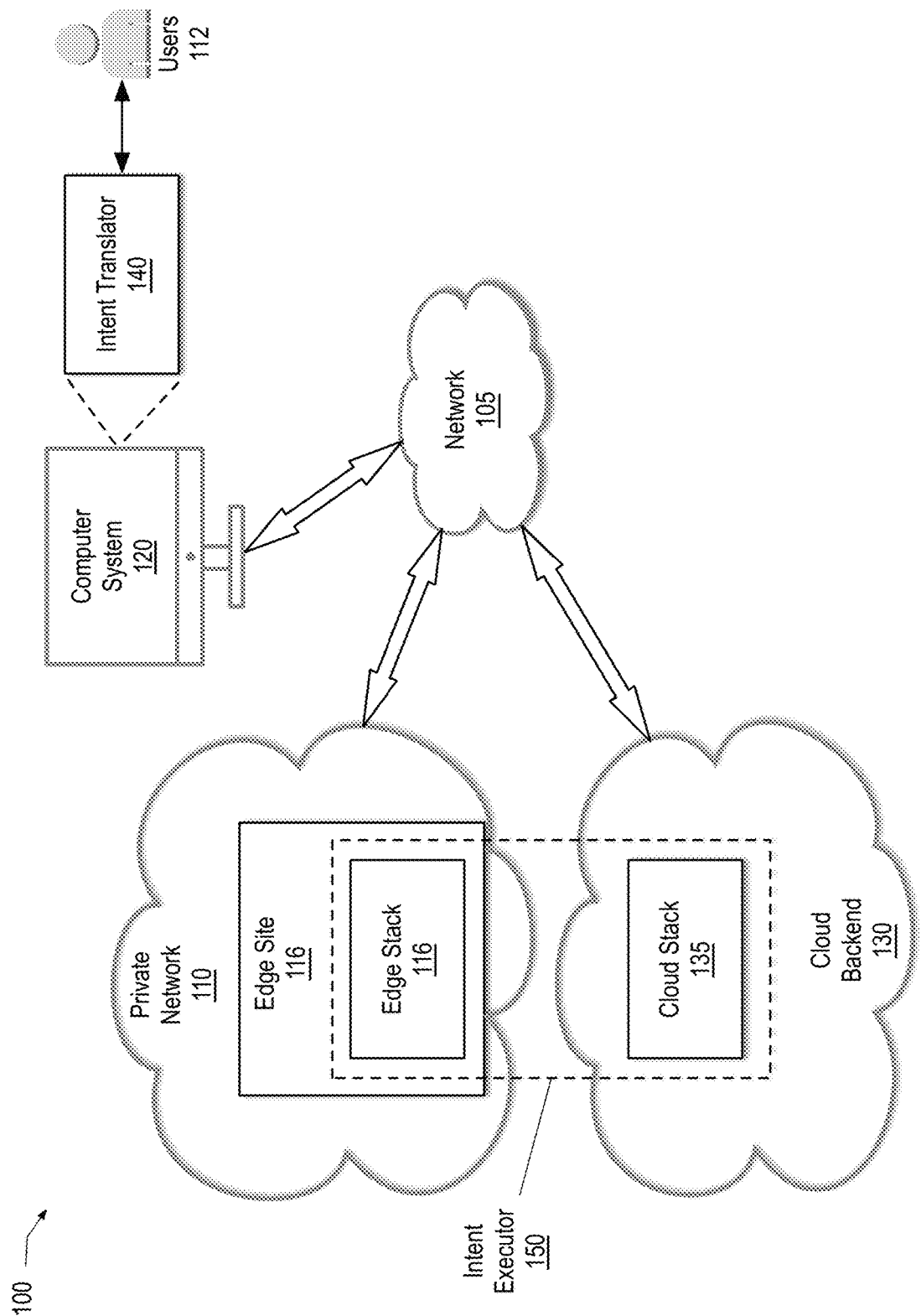
FIG. 1 shows a high-level block diagram illustrating a high-level architecture in accordance with an example embodiment.

Embodiments described herein are generally directed to an edge-CaaS (eCaaS) framework for providing life-cycle management of containerized applications on the edge. Numerous specific details are set forth in order to provide a thorough understanding of example embodiments. It will be apparent, however, to one skilled in the art that embodiments described herein may be practiced without some of these specific details.

Cloud applications are being containerized to achieve better flexibility, scalability, and agility. Meanwhile, the applications used by many businesses (e.g., retail, healthcare, manufacturing, oil and gas, energy, transportation, restaurants, and others) are extending beyond data centers. For example, enterprises are extending their business workload from data centers to edge locations to perform operations such as data acquisition, machine learning (ML) inference tasks, and the like. Deploying applications on the edge brings several benefits to enterprises, such as data privacy protection and response latency reduction, and as a result enable new features and services. However, edge computing also introduces new challenges for managing infrastructure and container orchestration platforms on the edge.

Among the challenges is the fact that most existing CaaS offerings assume applications are to be deployed in the cloud or within large data centers. Heterogeneity and lack of sufficiently trained Information Technology (IT) professionals are additional roadblocks that hinder edge site development by businesses in traditional industries (e.g., retail, healthcare, manufacturing, oil and gas, energy, transportation, restaurants, and others) that are outside of IT. With respect to heterogeneity, while businesses may maintain a number of edge sites and run similar workloads or applications on those edge sites, each edge site may be composed differently in terms of available resources, site functionality, and network connectivity. For example, there may be "hub" sites and "satellite" sites, each of which may perform different operations and each of which may be equipped with different operational technology (OT) (e.g., hardware and software used to change, monitor, and/or control physical devices, processes, and/or events within the organization), Internet-of-Things (IoT) devices, and/or accelerators. With respect to the lack of sufficiently trained Information Technology (IT) professionals, although businesses in traditional industries may have IT teams that are familiar with traditional IT tools and the businesses may be willing to invest in business and application levels that are perceived to be core parts of their businesses, many of these businesses may not be in a position to or have the desire to invest the time and resources to expand and/or train their IT teams to develop and deploy containerized edge computing systems. Configuring and optimizing the infrastructure and platform levels of edge sites involves significant specific IT domain expertise and is often considered a challenging, but non-critical, task for traditional industrial businesses that may not be familiar with container-based technologies. On the other hand, edge computing service providers are proficient at low-level optimization, but may not have sufficient understanding of the business use cases to build customized edge sites.

Various embodiments described herein seek to address various of the aforementioned challenges from an edge computing service provider perspective so as to facilitate management of heterogeneous containerized edge sites at scale by business customers from various industries. According to one embodiment, edge site configuration and deployment may be automated through the use of an eCaaS framework that provides life-cycle management of containerized applications on the edge. In one embodiment, the eCaaS framework may be used by business customers to quickly create containerized edge sites with edges-specific container orchestration platforms and given applications by simply specifying their intents. For example, declarative intents indicative of a use case for which a cluster of a container orchestration platform is to be deployed within an edge site may be received via a user interface (UI). Then, the eCaaS framework may automatically analyze the intents of the use case, select and configure the appropriate container orchestration platform (e.g., Kubernetes (K8s), K3s, or KubeEdge), and finally deploy the selected edge system and applications. For example, a deployment template may be generated with specifications at four different levels (e.g., an infrastructure level, a platform level, an application level, and a business level) by performing intent translation on the declarative intents and based on a set of constraints (collectively, representing a set of base deployment rules and any additional enhancements/modifications). The deployment template may identify, among other things, the container orchestration platform selected by the intent translation from multiple supported container orchestration platforms. The edge site may then be deployed and configured by executing the deployment template. The deployment and configuration may include (i) causing an infrastructure provider (e.g., a bare-metal-as-a-service (BMaaS) provider) and/or a virtual-machine-as-a-service (VMaaS) provider) to provision and configure the infrastructure associated with a private network that will serve as the edge site; (ii) causing an edge cluster provider (e.g., a provider supporting Kubernetes or a lightweight distribution of Kubernetes) to install the container orchestration platform on the infrastructure; (iii) configuring the cluster within the container orchestration platform; and (iv) deploying a containerized application or part thereof (e.g., an OT application, such as an industrial IoT application (e.g., PCT Thingworx or Litmus Automation), a video analytics application, etc.) on the cluster in accordance with the deployment template. It is to be appreciated although various embodiments may be described with reference to the containerized application as a whole being deployed within an edge site, parts of the containerized application may alternatively be distributed between the edge site and the cloud.

Terminology

The term "edge computing" generally refers to a distributed computing framework or topology in which application functionality is brought closer in terms of network latency and/or geography to data sources than centralized datacenter or cloud infrastructure. For example, edge computing may facilitate reduction in latency by allowing Internet-of-Things (IoT) devices to avoid relaying locally collected and/or produced data back to a centralized network server in accordance with traditional cloud computing architectures by instead processing the data (or at least some portion thereof) closer to the IoT devices, for example, within a private network in which the IoT devices operate. This proximity to the data at its source provides a number of benefits, including faster insights, quicker response times and improved bandwidth availability.

As used herein, an "edge site" generally refers to a deployment of compute and storage resources outside of centralized datacenter and cloud infrastructure in which edge computing is performed. In various examples described herein, a private network and its associated infrastructure may serve as an edge site after being properly deployed and configured.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not necessarily required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment" or "an embodiment" means that a particular feature, structure, or characteristic described in connection with the embodiment can be included in at least one embodiment of the invention. The appearances of the phrase "in one embodiment" are not necessarily all referring to the same embodiment.

System Architecture

FIG. 1 shows a high-level block diagram illustrating a high-level architecture in accordance with an example embodiment. Rather than sending all data collected by data sources (e.g., OT and/or IoT devices) directly to the cloud, edge computing processes some portion of the data within a network (e.g., a private network of an organization) that is closer in terms of network latency and/or geography to the data sources than a centralized datacenter or cloud infrastructure. Various embodiments described herein facilitate creation, configuration and deployment of an edge site (e.g., edge site 116) on behalf of an organization that may not have sufficient IT domain expertise by automating the process and allowing the process to be driven based upon high-level declarative intent regarding the business use case for the edge site.

In the context of the present example, a private network (e.g., private network 110), containing infrastructure to support the edge site, and a cloud backend (e.g., cloud backend 130) are coupled in communication via a network (e.g., network 105). The cloud backend may be in various forms, including private, public, and/or hybrid clouds. For example, the cloud backend may make use of IT resources of an enterprise data center (e.g., an on-premise data center) that is owned and operated by an organization or a data center managed by a third party (or a managed service provider) on behalf of the organization, which may lease the equipment and infrastructure. In other examples, the cloud backend may include a colocation data center in which an organization rents space of a facility owned by a third party and located off premise. Alternatively, a public cloud provider (e.g., Amazon, Microsoft, or Google) may serve as the cloud backend.

Users 112 may provide information regarding the high-level intents (e.g., declarative intents expressed at the business and application levels) of the business use case via an intent translation module (e.g., intent translator 140) running on a computer system 120. The computer system 120 may be part of the private network or may be coupled in communication with the private network via network 105. The users 112 may include eCaaS developers associated with the eCaaS framework provider and/or eCaaS users (e.g., members of the IT team of the business making use of and/or serving as administrators of the eCaaS framework). The intent translation module may be responsible for analyzing the high-level intents and generating a detailed deployment template. As described further below, in one embodiment, the generation of the deployment template by the intent translation module may involve applying a set of constraints (e.g., default deployment rules as enhanced/modified by additional user-specified constraints) and solving a satisfiability modulo theories (SMT) optimization problem. Example functional units of the intent translator 140 are described below with reference to FIG. 2.

Based on the output (e.g., a deployment template) of the intent translation module, an intent executor (e.g., intent executor 150) may deploy the edge site and applications within the private network. Components of the intent executor may include a user interface (not shown), an edge stack 116 operable within the edge site, and a cloud stack 135 operable within the cloud backend. Example functional units of the intent executor 150 are described below with reference to FIG. 2.

Figure 2:
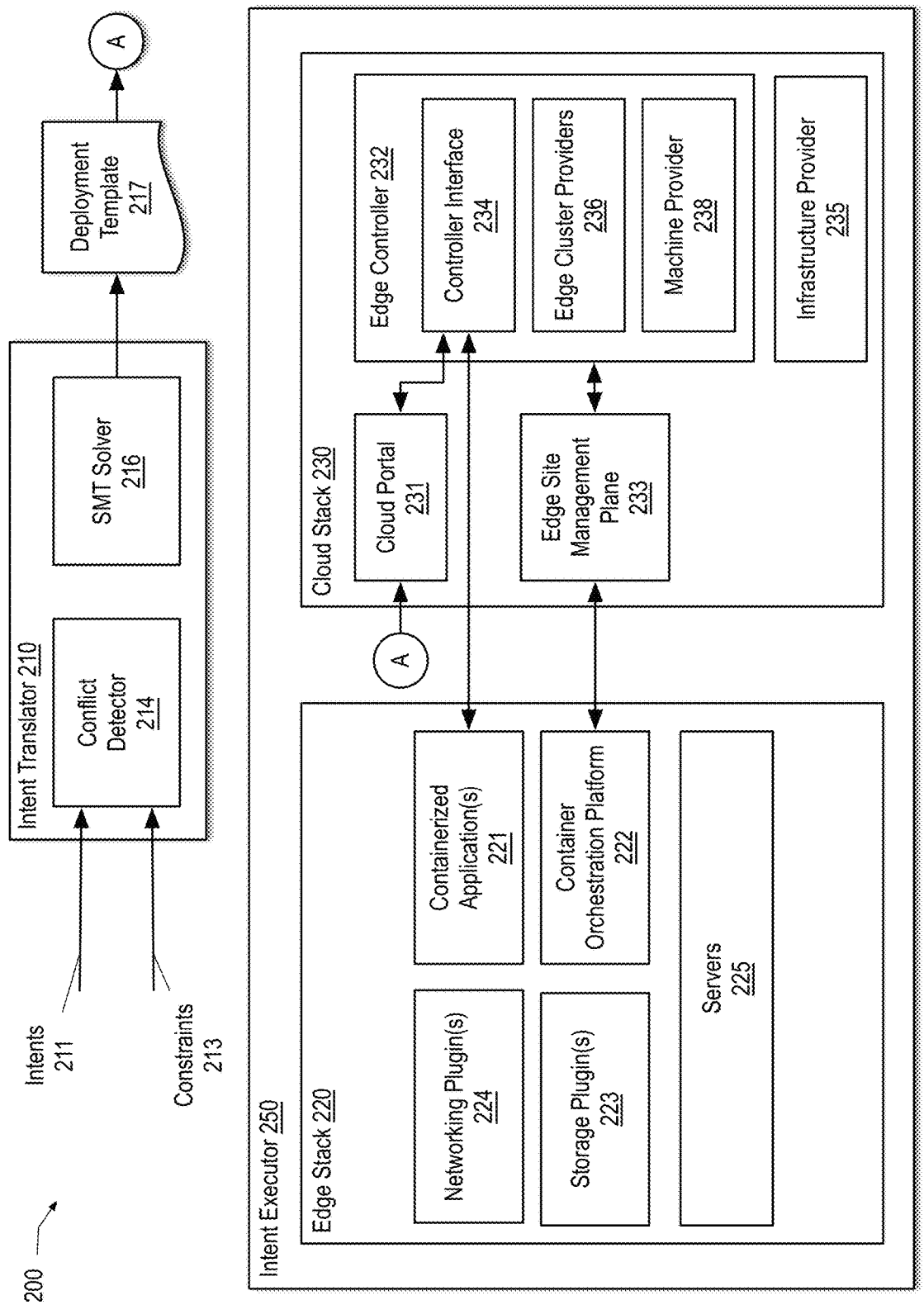
FIG. 2 shows a block diagram illustrating a system architecture of an edge-container-as-a-service (eCaaS) framework in accordance with an example embodiment.

FIG. 2 shows a block diagram illustrating a system architecture 200 of an edge-container-as-a-service (eCaaS) framework in accordance with an example embodiment. In the context of the present example, an intent translator 210, which may correspond to intent translator 140 of FIG. 1, includes a conflict detector 214 and an SMT solver 216. Intents 211 and some portion of constraints 213 may be received from a user (e.g., one of users 112) via a user interface and processed by the conflict detector 214 before generating a deployment specification in the form of an SMT optimization problem to be input to the SMT solver 216.

The intents 211 may be in the form high-level declarative intents indicative of a use case for which a cluster of a container orchestration platform is to be deployed within an edge site (e.g., edge site 116)). Non-limiting examples of intents 211 may include business type (e.g., production factory, retail store, restaurant, stadium, etc.), edge application (e.g., video analytics, video streaming, ML inference, etc.), estimated workload information, OT/IoT devices (e.g., security cameras, thermal sensors, etc.). Additional examples of intents 211 (expressed as inputs of an SMT optimization problem) are described below with reference to Table 1.

Constraints 213 may represent a set of constraints on selection of low-level configurations (e.g., at the platform level or the infrastructure level) of various aspects of the edge site. Constraints 213 may include a base set of deployment rules established by the eCaaS framework provider as well as user-specified constraints in place of and/or in addition to the base set of deployment rules. The deployment rules may specify default selections based on domain expertise relating to edge site configuration and deployment and/or investigations into how different businesses tend to make use of edge sites. For example, at the platform level, there may be a number of container orchestration platforms (e.g., Kubernetes, OpenShift, Docker Swarm, and Rancher) available for selection as well as their edge-specific variants (e.g., K3s, KubeEdge, and LF Edge). Each container orchestration platform may have unique advantages for specific business use cases. The constraints 213 may be input in the form of simplified expressions (e.g., "if . . . , then . . . " statements) specifying conditions in which various low-level configurations are to be selected. Examples of constraints are described in further detail below.

In some circumstances conflicts may exist in the user intents and/or in the constraints. For example, selection of local storage for the container storage interface (CSI) may be inferred by a user input expressing a desire to use solid-state drive (SSD) storage, whereas the user may also indicate the use of video applications requiring persistent storage that leads to a selection of Data Fabric (DF) for the CSI. According to one embodiment, these two types of conflicts are detected and resolved by the conflict detector 214 prior to outputting an intermediate deployment specification for analysis by the SMT solver 216. Examples of conflict detection/resolution are described below with reference to FIGS. 5-8.

To connect low-level and high-level specifications, the intermediate deployment specification may be generated by the intent translator 210 based on the constraints 213 in the form of an SMT optimization problem or an SMT constraint satisfaction problem to be input to the SMT solver 216. The SMT solver 216 may apply an optimization algorithm to the SMT constrain satisfaction problem to generates one or more edge site deployment plans (e.g., deployment template 217) that satisfy both the intents and the constraints 213.

In order to facilitate automation of the intent translation process, in one embodiment, all possible design choices may be modeled as equations or predicates in first-order logic format (which may also be referred to herein as conjunctive normal form (CNF) formulas). For example, let $O_{CSI}(DF)$ represent a Boolean variable indicating use of a data fabric (DF) as the CSI (if $O_{CSI}(DF)$ is 1) and $O_{kube}(ke)$ represent use of KubeEdge (if $O_{kube}(ke)$ is 1). If the data fabric is not supported with KubeEdge, then this can be modeled as a Boolean SAT instance $O_{CSI}(DF)$ Λ —$O_{kube}(ke)$. To satisfy this SAT instance, $O_{CSI}(DF)$ must be True and $O_{kube}(ke)$ must be False, indicating that if the data fabric is being used as the storage platform then KubeEdge cannot be used as the container orchestration platform.

Similarly, SMT provides for additional functions and symbols that may be used to build a comprehensive set of first-order logic equations so as to cover all possible design paths. These equations are the SMT instances of the SMT constraint satisfaction problem. The SMT solver 216 takes as input the SMT instances and the values extracted from the high-level intent to check for the satisfiability of the set of equations. Non-limiting examples of SMT solvers that produce satisfiability results for system of equations with multiple solutions include Z3 and MathSAT. In the case of multiple solutions being output by the SMT solver 216, any of the recommended deployment plans can be selected as the deployment template 217. Alternatively, the intent translator 210 may use other intent goals (e.g., a service level agreement (SLA) or cost) to make the final decision. The formulation of the deployment template 217 and/or the model of the design choices may also be updated in subsequent iterations to incorporate more or fewer intents 211 and/or constraints 213. Table 1 summarizes notations that may be used in various expressions of the formulations.

TABLE 1

Notations for Intents, Constraints, and Inputs
and Outputs of the SMT Optimization Problem

| Notation | Description | Example Values |
|---|---|---|
| $I_{bs}$ | Type of business | Retail, healthcare, manufacturing, . . . |
| $I_{n\_serve}$ | Number of servers available | 2, 5, 10, . . . |
| $I_{app}$ | Edge application to be deployed | Video analytics, data acquisition, inference, Kubeflow, shopping cart web server, . . . |

TABLE 1-continued

Notations for Intents, Constraints, and Inputs
and Outputs of the SMT Optimization Problem

| Notation | Description | Example Values |
|---|---|---|
| $I_{dev}$ | OT/IoT devices | Camera, thermal sensors, scanner, . . . |
| $I_{HA}$ | High-availability (HA) requirement | Required, not required, if possible, . . . |
| $I_{wkl}$ | Workload estimation | Low, medium, high, . . . |
| $I_{stg}$ | Storage requirement | Local, external, network file system (NFS), Ezmeral Data Fabric (DF), . . . |
| $I_{net}$ | Required quality of service (QoS) of the network | Istio required, network isolation/policy, simple, . . . |
| $O_{Os}$ | Operating system (OS) of bare metal servers | Debian, Ubuntu, OpenSUSE, CentOS, . . . |
| $O_{kube}$ | Kubernetes variants | K8s, K3s, KubeEdge, . . . |
| $O_{CNI}$ | Container network interface | Flannel, Calico, . . . |
| $O_{CSI}$ | Container storage interface | Local persistent volume, Ezmeral Data Fabric (DF), . . . |
| $O_{n\_mas}$ | Number of master nodes | 1, 3, . . . |
| $O_{n\_wk}$ | Number of worker nodes | 1, 2, 3, . . . |
| $O_{loc\_mgmt}$ | Location of management plane | Edge or cloud |

Continuing with the present example, an intent executor 250 includes an edge stack 220 hosted on the edge tier infrastructure (e.g., servers 225) and a cloud stack 230 hosted on the cloud tier infrastructure. The cloud stack 230 may be hosted on a cloud backend (e.g., cloud backend 130) and components of the cloud stack 230 may be developed as Kubernetes-native extensions (e.g., Kubernetes Custom Resource Definitions (CRDs)). In this manner, the eCaaS framework can be easily extended by developers to support other types of edge infrastructure and container orchestration systems and IT professionals can debug eCaaS using traditional Kubernetes tools (e.g., kubectl).

When the deployment template 217 is finalized, the intent translator 210 sends the deployment template 217 to the intent executor 250 to deploy the edge site and applications. The intent executor 250 provisions and configures the selected edge servers (e.g., operating systems (OSs), libraries, network configurations, etc.), installs edge container orchestration platforms, and finally deploys the containerized applications. In some examples, in order to better utilize the limited compute resources on the edge, the edge stack 220 may adopt a lightweight Kubernetes edge variant and move an edge site management plane 233 from edge to the cloud.

In one embodiment, the edge stack 220 may be delivered as a turn-key edge computing solution including both an edge software platform and an edge hardware platform to further facilitate the auto-deployable nature of the edge site. In the context of the present example, the edge stack 220 is shown including networking plugin(s) 224, storage plugin(s) 223, containerized applications 221, a container orchestration platform 222, and the servers 225. Based on the intent translation, one of the networking plugin(s) (e.g., Flannel, Calico, Canal, etc.) may be selected to create an overlay network for containers instantiated on the worker nodes of the cluster. Similarly, based on the intent translation, one of the storage plugin(s) 233 may be selected to support persistent storage on behalf of the containers, for example, via one or more distributed storage platforms or data fabrics, non-limiting examples of which include the HPE Ezmeral Data Fabric data platform (formerly, the MapR Data Platform) produced by Hewlett Packard Enterprise Company and Longhorn produced by Rancher Labs.

The containerized applications 221 (e.g., data acquisition, Kubeflow, video analytics, video streaming, ML inference, OT/IT edge analytics, shopping cart web server, etc.) represent a set of edge applications that have been deployed within an edge cluster, for example, after the automated deployment and configuration of the edge site has been completed. The container orchestration platform 222 represents one of a number of container orchestration platforms (e.g., Kubernetes (K8s), K3s, KubeEdge, or other edge Kubernetes variants) supported by the eCaas framework after having been selected based on the intents 211 and constraints 213 and installed on the servers 225.

In one embodiment, the cloud stack 230 includes a cloud portal 231, the edge site management plane 233, an edge controller 232, and an infrastructure provider 235. The cloud portal 231 may represent a connecting point between a user interface, which may be presented to the user via a web browser, the intent translator 210, and the intent executor 250. The infrastructure provider 235 may be responsible for provisioning and configuring the edge tier infrastructure as specified by the edge site information within the deployment template 217. According to one embodiment, various bare-metal-as-a-server (BMaaS) APIs (e.g., cloud-managed bare metal provisioning APIs) may be leveraged to configure servers 225. Additionally, VM-as-a-Service APIs (e.g., Morpheus Data, MistIO, or CloudBolt) may be utilized to provision VMs for running the edge site management plane 233.

The edge controller 232 may include a controller interface 234, edge cluster providers 236, and a machine provider 238. The edge controller 232 serves as a controller for the edge site and may connect to the servers 225 or VMs once they are fully configured. The edge controller 232 may be responsible for, among other things, deploying the selected container orchestration platform on the nodes of the edge cluster. The controller interface 234 may serve as an interface to external entities to the edge controller 232 and may forward some application traffic (e.g., UI traffic to the cloud portal 231 to facilitate management of the applications 221 via the cloud portal 231). In one embodiment, the edge cluster providers 236 and machine providers 238 are software data structures or objects (e.g., K8s CRD instances) corresponding to the edge site and the servers and are used for management purposes. For example, a machine provider object may maintain the Internet Protocol (IP) address and credentials for a server on the edge so the eCaaS framework can access that server to configure it.

Example Business Use Case

A non-limiting example of a business use case in the healthcare industry may involve a healthcare provider that manages a group of hospitals desiring to implement a new ML-based medical system to help their doctors better server patents. The ML-based medical system may use deep neural network models to analyze high-resolution computed tomography (HRCT) scans to assist radiologists discover minor changes in a patient's HRCT scans to facilitate diagnosis of health issues at early stages.

An example of a proposed system architecture to support such an ML-based medical system may consists of multiple components deployed at three tiers: cloud tier, edge tier, and device tier. The cloud tier may include most of the development components such as code repositories, model training, model repositories, persistent data store, and container image repositories. The cloud tier can be built within private corporate data centers, a public cloud, or a hybrid environment of both. Most of the compute-intensive tasks (e.g., model training using graphical processing units (GPUs)) may be performed at the cloud tier.

The edge tier may be located in private networks of the hospitals and may perform edge device management and run the inference-related components, including an ML inference application, a local data cache, a local container image registry, etc. Some sites at the edge tier may include no more than a few servers (potentially having different capabilities), usually no more than a rack. Such a business use case does not require constant network connectivity, but regular inference tasks should not be interrupted when disconnected from the cloud tier. When network connectivity is available, however, the edge tier components should regularly check the cloud tier for model refreshing and perform desired data transmission.

In the context of the present example, the device tier can be considered as sources of medical data and inference requests including laptops, workstations, traditional medical equipment, and other low-power devices. These devices may connect to the edge tier via different types of networks (e.g., as Wi-Fi, Ethernet, and/or industrial communication buses).

To support this type of medical system, the proposed system architecture may include a containerized edge site for each hospital of the healthcare provider and should be able to be managed from the cloud tier. Based on the requirements of autonomous operation of the edge tier and the connectivity with medical devices, KubeEdge should be selected as the container orchestration platform since it is able to handle network disconnection more gracefully and support native device management on the edge. Also, due to the low network requirements at the edge tier, Flannel may be used as the container network interface (CNI) over Calico, Canal, and others because it is easy to use and maintain. While Flannel provides only basic networking functionalities, it has low overhead and stable performance, thereby making is a suitable choice for this example medical system.

Depending on the size of the hospital within the group, there may be very limited resources on the edge. For example, there may be two or three heterogeneous servers available for creation of the edge site at issue. To dedicate more computing resources to application workload, the master node of the container orchestration platform may be moved back to the cloud tier and run within a VM. Making such decisions at scale requires time and expertise. Instead of determining the configurations manually, embodiments herein make use of an intent translation module that takes user inputs and applies constraints to automate making such decision.

For purposes of illustration an example set of constraints (e.g., constraints 213) expressed in "if . . . , then . . . " format are provided below in Table 2.

TABLE 2

Example Constraints

| If . . . | Then . . . |
|---|---|
| $I_{bs}$ = healthcare | $O_{kube}$ = kubeedge |
| $I_{bs}$ = retail | $O_{kube}$ = K3s |
| $I_{bs}$ = manufacturing | $O_{kube}$ = kubeedge |
| $I_{n\_serv}$ < 3 | $O_{loc\_mgmt}$ = cloud |
| $I_{HA}$ = high | $O_{n\_mas}$ = 3 |
| $I_{n\_serv}$ ≤ 5 && $I_{HA}$ = high | $O_{loc\_mgmt}$ = cloud |
| $I_{app}$ = video && $I_{stg}$ = persistent | $O_{CSI}$ = DF |
| $I_{stg}$ = SSD | $O_{CSI}$ = local |

Example Predicates

FIGS. 3A and 3B depict examples of predicates in first-order logic format that may be used to model various design choices for an edge site in accordance with an example embodiment. According to one embodiment, a set of default deployment rules (e.g., a first subset of constraints 213) expressed in the form of multiple predicates in first-order logic format may be used to model all possible design choices relating to the edge site. The set of default deployment rules may be enhanced and/or modified with additional user-specified constraints (e.g., a second subset of constraints 213). While space limitations preclude describing an exhaustive set of set predicates for all possible design paths, some examples are provided below for reference. Based on the various examples provided herein, one of ordinary skill in the art would be able to construct appropriate predicates for other design choices.

As one example, two sets of constraints 310 and 320 may be used to indicate when a data fabric is used either K8s or K3s may be selected as the Kubernetes variant. Furthermore, K3s may be used when the estimated workload is not high and HA is not required or K3s may be selected when the estimated workload is not high, HA is required, and use of an external data store is desired, or K8s may be selected when the estimated workload is high. As another example, a set of constraints 330 may be used to select KubeEdge when the type of business is healthcare or manufacturing and to select K3s when the type of business is retail.

In various examples described herein, the various functional units (e.g., conflict detector 214, SMT solver 2116, edge stack 116 and 220, and cloud stack 135 and 230) and the processing described below with reference to the flow diagrams of FIGS. 4, 5, and 7 may be implemented in the form of executable instructions stored on a machine readable medium and executed by a processing resource and/or by other types of electronic circuitry. For example, the processing may be performed by one or more virtual or physical computer systems of various forms, such as the computer system described with reference to FIG. 9 below.

Automated Establishment of a Containerized Edge Site

Figure 4:
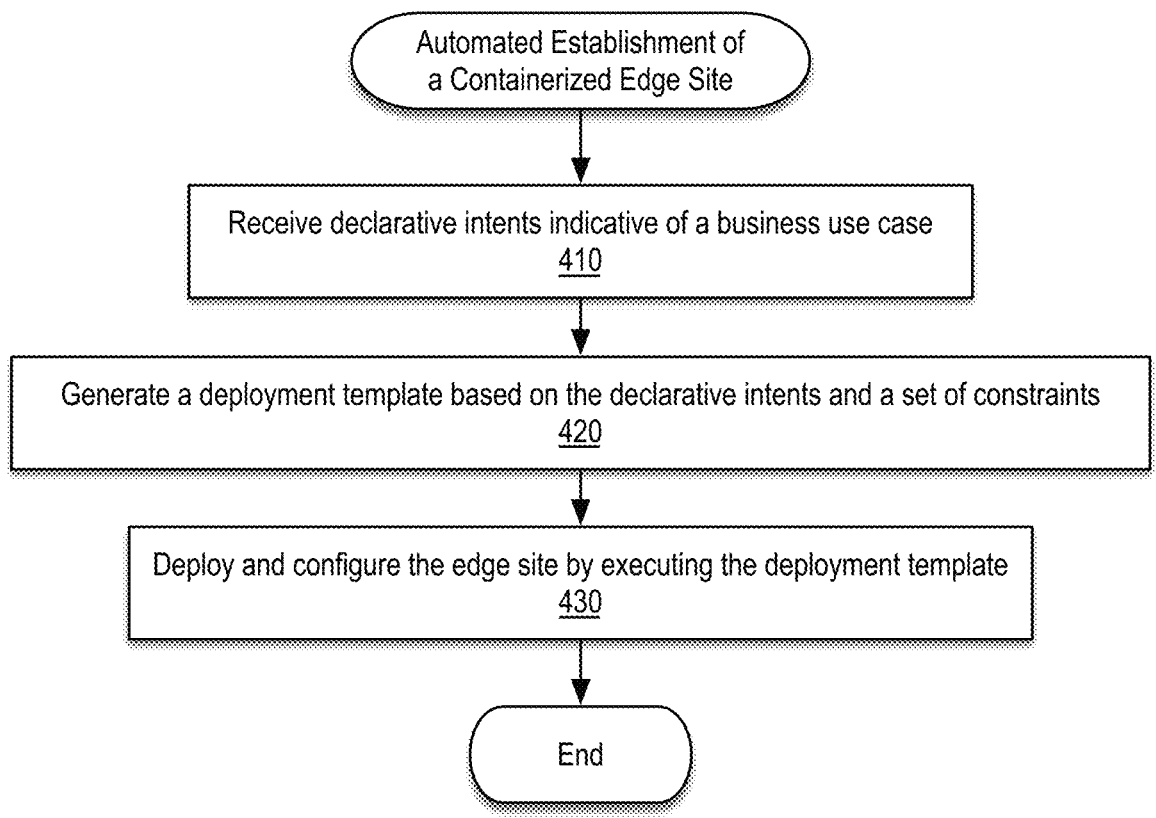
FIG. 4 shows a flow diagram illustrating a set of operations for automated establishment of a containerized edge site in accordance with an example embodiment.

FIG. 4 shows a flow diagram illustrating a set of operations for automated establishment of a containerized edge site in accordance with an example embodiment. In the context of the present example, a high-level overview is provided regarding the end-to-end processing that may be performed by the intent translator (e.g., intent translator 140 or 210) and the intent executor (e.g., intent executor 150 or 250). In order to provide a concrete example of the eCaaS framework in a practical use case, various of the blocks discussed below may described with reference to deploying the eCaaS framework in the context of the healthcare industry business use case example outlined above.

At block 410, declarative intents (e.g., intents 211) are received indicative of a business use case. According to one embodiment, the declarative intents may be input by a user (e.g., one of users 112) via a user interface of a cloud portal (e.g., cloud portal 231). Alternatively, a file may be uploaded to the cloud portal containing the declarative intents. Non-limiting examples of declarative intents include information directly or indirectly identifying the type of business, the number of edge servers (e.g., servers 225) available for the edge site, the edge application to be deployed, the types of OT and/or IoT devices expected to interact with the edge site, whether an HA architecture is desired, an estimate regarding the workload to be handled by the edge site, desired storage, and network QoS expectations/desires.

At block 420, a deployment template (e.g., deployment template 217) is generated based on the declarative intents and a set of constraints (e.g., constraints 213). According to one embodiment, the declarative intents are converted to variables that may be used during intent translation performed by an intent translator (e.g., intent translator 210). Alternatively, the intent translator may receive input variables (e.g., those described above with reference to Table 1) directly in a human-readable and machine-readable data-interchange format (e.g., JavaScript Object Notation (JSON) or Extensible Markup Language (XML)) or in the form of a declarative logic programming language (e.g., in Datalog format). According to one embodiment, the deployment template may be generated by creating an SMT optimization problem and applying an SMT solver (e.g., SMT solver 216) to the SMT optimization problem. For example, the SMT optimization problem may be created by replacing the variables of the predicates modeling the design choices (e.g., representing the default deployment rules as modified by any user-specified constraints) with those dictated by the design intents.

According to one embodiment, the resulting design template may include technical specifications at the infrastructure level (e.g., the OS to be installed on bare-metal servers), a platform level (e.g., the edge Kubernetes variant to be used as the container orchestration platform), an application level (e.g., video analytics or data acquisition, etc.), and a business level (e.g., retail, branch office, restaurant, factory, etc.). As noted above, there may be multiple available solutions (feasible deployment plans) output by the SMT solver. If so, any of the deployment plans can be used as the deployment template. Alternatively, the intent translator may use other intent goals (e.g., a service level agreement (SLA) or cost) to make the final decision.

Prior to generating the deployment template, one or more conflict detection/resolution approaches may be applied to the declarative intents and the set of constraints to ensure feasibility. Alternatively, the one or more conflict detection/resolution approaches may be applied responsive to a determination by the SMT solver that a feasible solution cannot be found. Non-limiting examples of conflict detection/resolution approaches are described below with reference to FIGS. 5-8.

At block 430, the edge site is deployed and configured. In one embodiment, the deployment and configuration process may involve the intent executor causing an infrastructure provider (e.g., infrastructure provider 235) to provision and configure the infrastructure in accordance with the deployment template and causing a VMaaS and/or a BMaaS provider to configure the available edge servers for the edge site based the specifications provided within the deployment template. For example, cloud-managed bare metal provisioning may be leveraged to configure the edge servers with embedded server management technology to facilitate out-of-band management of the edge servers and VMaaS APIs may be used to provision VMs for running edge site management.

Additionally, the intent executor may cause an edge cluster provider (e.g., edge cluster provider 236) to install the selected container orchestration platform on the infrastructure. According to one embodiment the output variables of the intent translator are converted to Kubernetes CRDs and communicated to an edge controller (e.g., edge controller 232), for example, via a cloud portal (e.g., cloud portal 231). The edge controller may cause the edge cluster provider to install the selected container orchestration platform (e.g., KubeEdge in the context of the healthcare industry example business use case) on the infrastructure (e.g., servers 225). According to one embodiment, the intent executor may further connect the edge site management plane (e.g., edge site management plane 233) in the cloud with the edge servers by establishing a secure networking channel (e.g., a virtual private networking (VPN) tunnel or the like). In this manner, a stretched network may be provided for rendering the communications between the edge site management plane and edge servers and for making the application dashboard available via a user interface (e.g., a user interface of the cloud portal). For example, the application dashboard may be forwarded to the edge controller via a controller interface (e.g., controller interface 234) to make it available on the user interface.

After the container orchestration platform has been installed the cluster may be configured within the container orchestration platform. In one embodiment, the edge controller may configure the worker nodes of the cluster within the edge tier on-premise server cluster (e.g., bare-metal in the context of the healthcare industry example business use case) and configure the edge site management plane (e.g., a master node) to operate on the cloud tier.

Finally, the containerized application(s) may be deployed on the cluster in accordance with the deployment template. In the context of the healthcare industry example business use case, after KubeEdge has been deployed, the edge site management plane may notify the edge controller via a controller interface that it is ready to deploy the AI/ML application. Responsive to the notification, the application (or portion thereof) may be deployed, and the application end-point domain address may be exposed to the user via the cloud portal. In one embodiment, the application may be pulled from a repository hosting service (e.g., a Github repository) or a container or image registry (e.g., an Amazon Web Services (AWS) docker image registry).

While in the context of the present example and in the context of subsequent flow diagrams, a number of enumerated blocks are included, it is to be understood that embodiments may include additional blocks before, after, and/or in between the enumerated blocks. Similarly, in some embodiments, one or more of the enumerated blocks may be omitted or performed in a different order.

Intent Conflict Detection/Resolution

Figure 5:
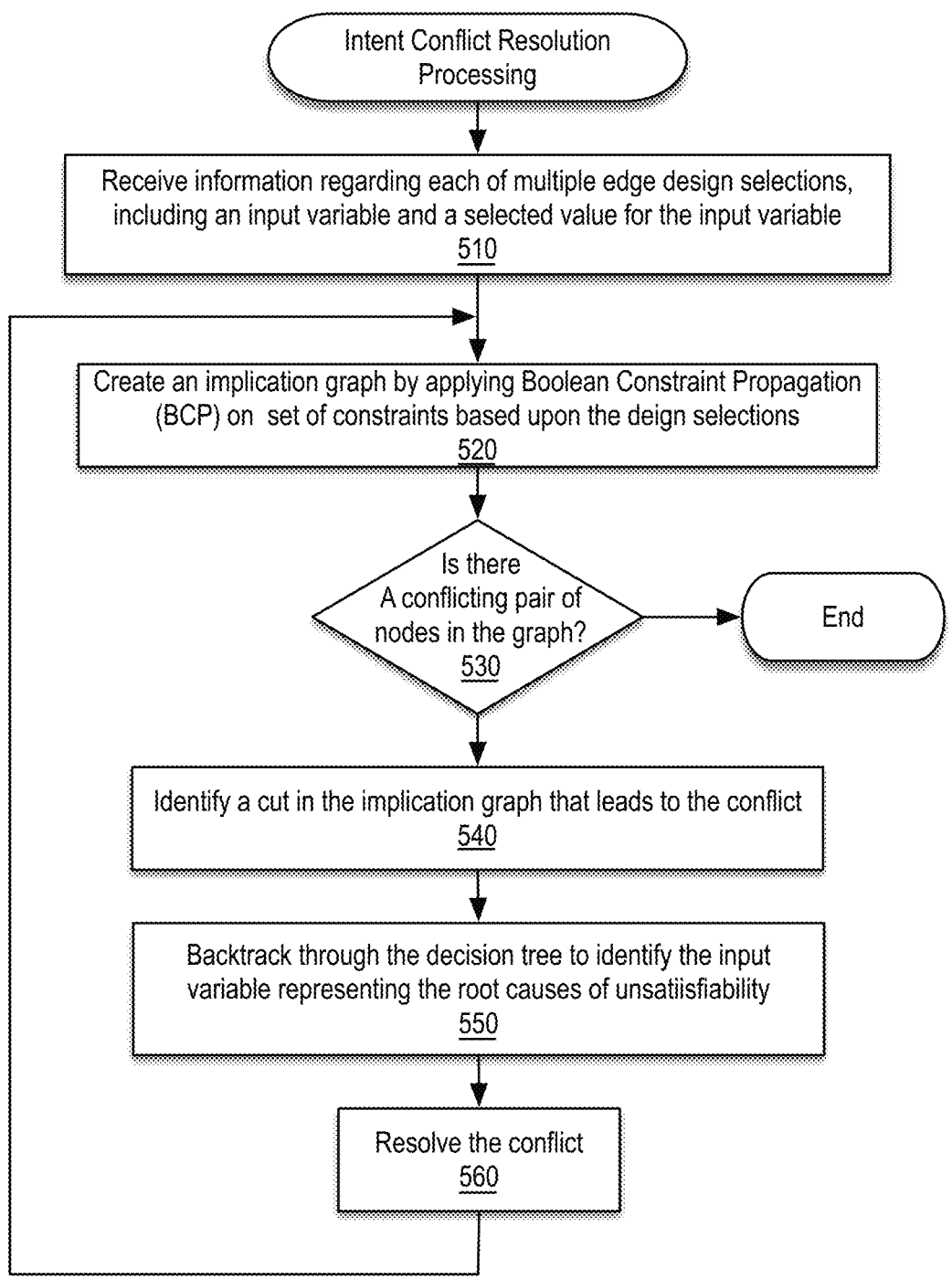
FIG. 5 shows a flow diagram illustrating a set of operations for intent conflict detection/resolution in accordance with an example embodiment.

FIG. 5 shows a flow diagram illustrating a set of operations for intent conflict resolution in accordance with an example embodiment. In the context of the present example, a conflict detection and resolution approach that may be performed within an intent translator (e.g., intent translator 210) by a conflict detector (e.g., conflict detector 214) is described. In one embodiment, the conflict detector uses a conflict-driven clause learning (CDCL) approach to find the root cause of unsatisfiability in the input variables set based on the declarative intents (e.g., intents 211).

At block 510, information regarding each of multiple edge design selections is received. According to one embodiment, the multiple edge design selections are expressed in the form of declarative intents (e.g., intents 211) indicative of a business use case in which each declarative intent directly specifies an input variable and a selected value for the input variable or provides information from which the input variable and the selected value may be inferred. The declarative intents may be input by a user (e.g., one of users 112) via a user interface of a cloud portal (e.g., cloud portal 231). Alternatively, a file may be uploaded to the cloud portal containing the declarative intents.

At block 520, an implication graph is created by applying Boolean Constraint Propagation (BCP) on a set of constraints (e.g., constraints 213) based upon the design selections. When an algorithm (e.g., CDCL) searches for a satisfying assignment for a CNF formula, one optimization involves looking for unit clauses. A clause is unit under a partial assignment when that assignment makes every literal in the clause unsatisfied but leaves a single literal undecided. Because the clause must be satisfied for the formula to be satisfied, there is no point in checking any assignment that would make that undecided literal false. As such, the algorithm can simply make its next guess such that the literal will be true and thus making the clause true. This process is known as BCP.

At decision block 530, a determination is made regarding whether there is a conflicting pair of nodes in the implication graph. If so, processing continues with block 540; otherwise processing is complete.

At block 540, a cut in the implication graph is identified that leads to the conflict. At block 550, backtracking is performed through a decision tree (e.g., decision tree 650 of FIG. 6) to the input variable (e.g., input 660 of FIG. 6) representing the root cause of unsatisfiability (infeasibility).

At block 560, the conflict is resolved. According to one embodiment, the conflict is resolved by prompting the user to select another value for the input variable identified in block 540. Upon receipt of the new value for the input value, processing loops back to block 520 to find any new conflicts until the problem becomes feasible.

FIG. 6A shows a concrete example of an implication graph 500 that may be used in block 530 of FIG. 5 in connection with identifying conflicts in user inputs during a CDCL algorithm. The gray-filled circles represent user inputs (e.g., input variables and their corresponding selected values) and the unfilled circles represent output variables after performing block 520 of FIG. 5.

In the context of the present example, the user has indicated a desire to have SSD storage (input 510), and also persistent storage (input 518) and has also indicated the edge cluster will be running a video analytic application (input 516). From these selected inputs, and assuming a set of constraints (e.g., constraints 213) includes those listed above in Table 2, the implication graph 500 is created. In this example, the selected input for SSD storage implies based on the constraints that $O_{CSI}(DF)=1$ (output 522); however, another constraint indicates that if $I_{app}$=video && $I_{stg}$=persistent, then $O_{CSI}(DF)=0$ (output 514). In this example, output 522 and output 514 are identified as being in conflict 516 and a cut 515 is identified in the implication graph 500 that leads to the conflict.

FIG. 6B shows a concrete example of a decision tree 550 that may be used in block 530 of FIG. 5 in connection with identifying conflicts in user inputs during a CDCL algorithm. The gray-filled rectangles represent user inputs (e.g., input variables and their corresponding selected values) and the unfilled rectangles represent output variables. Decision tree 550 shows the history of input selections (inputs 660, 666, and 668) received and outputs selected (outputs 562 and 564) by the CDCL algorithm. As shown, when the CDCL algorithm encounters a conflict (e.g., conflict 622), the CDCL algorithm may backtrack 516 more than one level within the decision tree 500 to the root cause of unsatisfiability in the input variables (in this case, input 660)

Constraint Conflict Detection/Resolution

Figure 7:
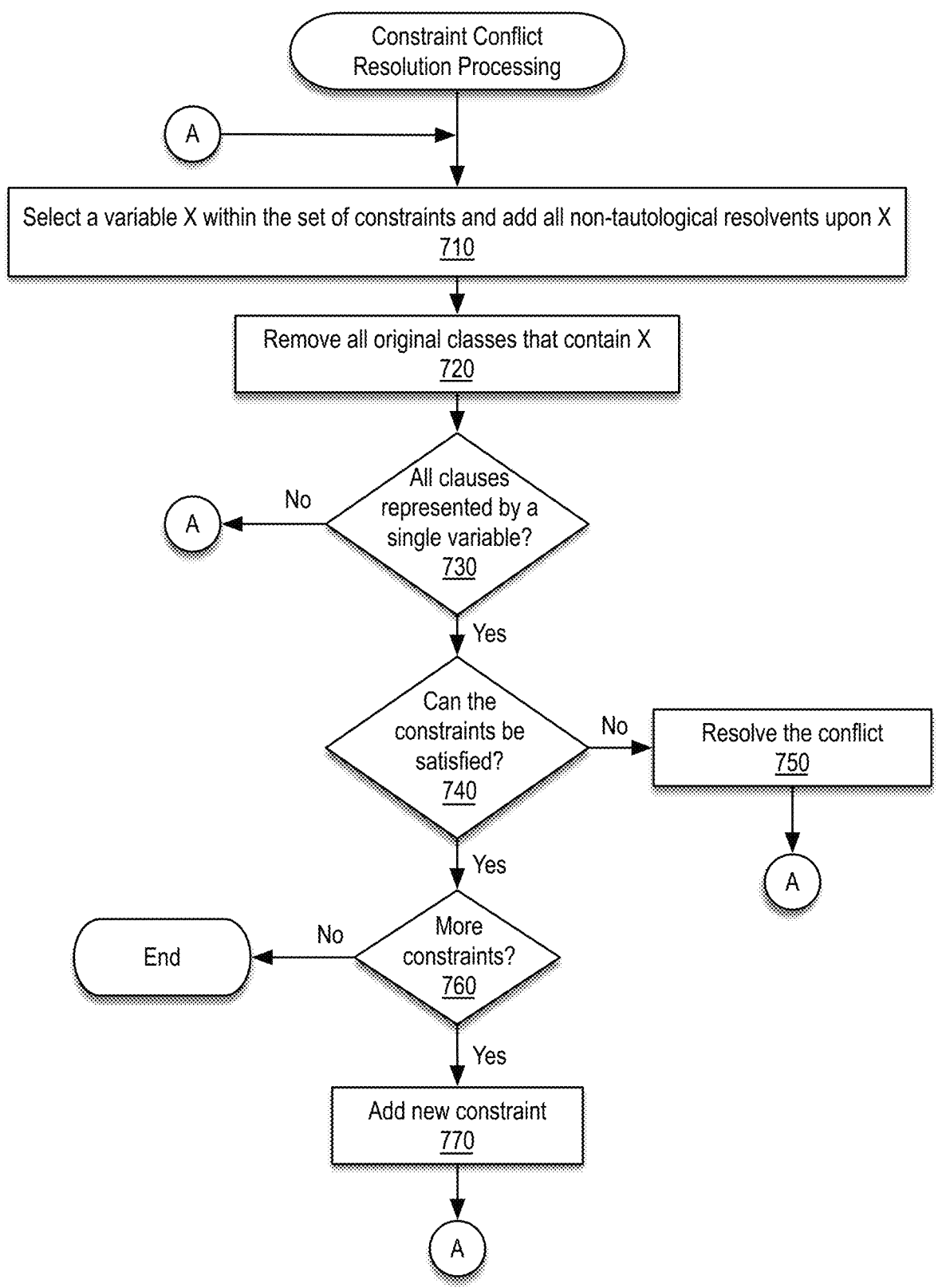
FIG. 7 shows a flow diagram illustrating a set of operations for constraint conflict resolution in accordance with an example embodiment.

FIG. 7 shows a flow diagram illustrating a set of operations for constraint conflict resolution in accordance with an example embodiment. In the context of the present example, another conflict detection and resolution approach that may be performed within an intent translator (e.g., intent translator 210) by a conflict detector (e.g., conflict detector 214) is described. In one embodiment, the conflict detector may make use of a dynamic programming approach inspired by the Davis-Putnam algorithm to determine whether newly added constraints (e.g., new constraints 720 of FIG. 8) conflict with an existing set of feasible constraints (e.g., existing constraints 810 of FIG. 8).

At block 710, a variable X is selected within the existing set of feasible and all non-tautological resolvents upon X. At block 720, all original clauses that contain X are removed. For example, in the context of FIG. 8, after performing blocks 710 and 720 on constraints 812, 814, and 816, they are reduced to constraints 822 and 824.

At decision block 730, a determination is made regarding whether all remaining clauses are represented by a single variable. If so, processing continues with decision block 740; otherwise, processing loops back to block 710.

At decision block 740, a determination is made regarding whether the constraints can be satisfied. If so, processing continues with decision block 760; otherwise, a conflict exists and processing branches to block 750 to resolve the conflict.

At block 750, the conflict is resolved. According to one embodiment, the conflict is resolved by prompting the user to input an alternative expression of the last added constraint (e.g., constraint 728), which created the conflict. Upon receipt of the alternative expression, processing loops back to block 710 to find any new conflicts until the set of constraints is satisfiable.

At decision block 760, a determination is made regarding whether there are more constraints to be added. If so, processing continues with block 770; otherwise, conflict detection processing is complete. In some embodiments, the newly added constraints may be sorted based on their relative priorities and added one by one in order of priority.

At block 770, a constraint is added to those under consideration from the newly added constraints and processing loops back to block 710.

Figure 8:
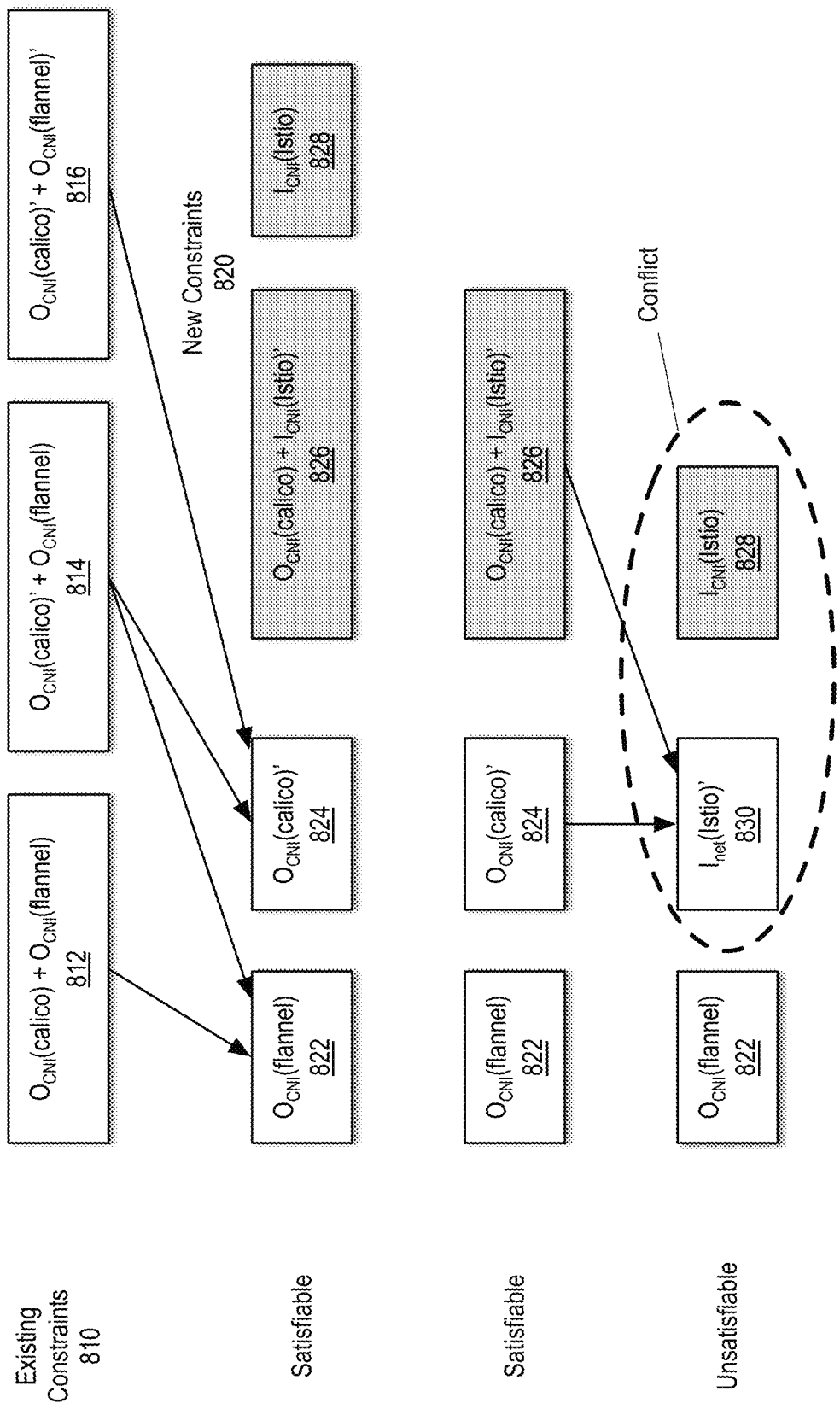
FIG. 8 shows a concrete example of the iterative approach performed by the constraint conflict detection/resolution approach of FIG. 7.

FIG. 8 shows a concrete example of the iterative approach performed by the constraint conflict detection/resolution approach of FIG. 7. In this example, the gray-filled rectangles represent new constraints 820 to be incorporated into an existing set of feasible constraints (e.g., existing constraints 810), represented as unfilled rectangles. In this example, the existing constraints 810, include constraint 812 ($O_{CNI}$ (calico)+$O_{CNI}$(flannel)), constraint 814 ($O_{CNI}$ (calico) '+$O_{CNI}$(flannel)), and constraint 816 ($O_{CNI}$ (calico)'+$O_{CNI}$ (flannel)'). In accordance with blocks 710 to 730 of FIG. 7, the existing constraints 810 are first reduced until all are represented by a single variable (e.g., constraints 822 and 824). Since the result is satisfiable. The new constraints 820 ($O_{CNI}$(calico)+$I_{net}$(istio)', and $I_{net}$(istio)) are next iteratively added and the satisfiability is checked. After adding the first new constraint 826, the set of constraints remains satisfiable, but after adding the second new constraint 828, a conflict is detected.

Figure 9:
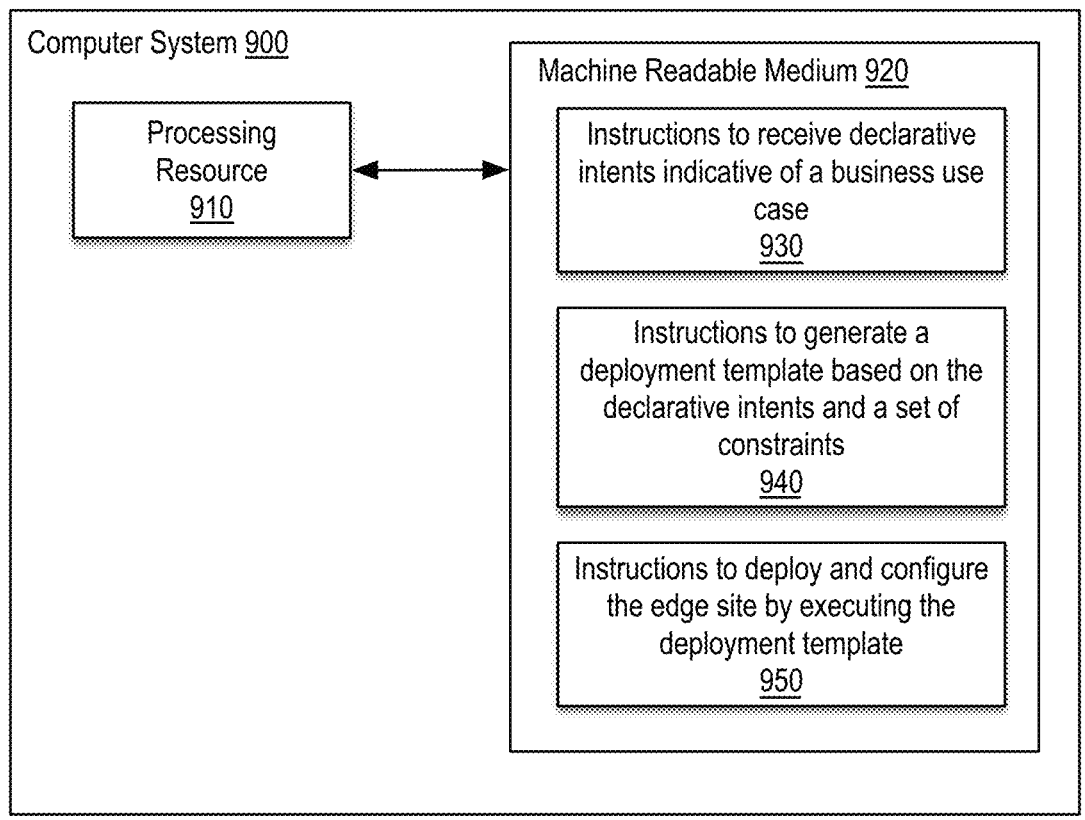
FIG. 9 shows a block diagram of an example computer system.

FIG. 9 shows a block diagram of a computer system in accordance with an embodiment. In the example illustrated by FIG. 9, computer system 900 includes processing resource 910 coupled to non-transitory, machine readable medium 920 encoded with instructions to perform one or more of the various methods described herein or implement one or more of the functional units described herein. Processing resource 910 may include a microcontroller, a microprocessor, CPU core(s), GPU core(s), an ASIC, an FPGA, and/or other hardware device suitable for retrieval and/or execution of instructions from machine readable medium 920 to perform the functions related to various examples described herein. Additionally, or alternatively, processing resource 910 may include electronic circuitry for performing the functionality of the instructions described herein.

Machine readable medium 920 may be any medium suitable for storing executable instructions. Non-limiting examples of machine readable medium 920 include RAM, ROM, EEPROM, flash memory, a hard disk drive, an optical disc, or the like. Machine readable medium 920 may be disposed within computer system 900, as shown in FIG. 9, in which case the executable instructions may be deemed "installed" or "embedded" on computer system 900. Alternatively, machine readable medium 920 may be a portable (e.g., external) storage medium, and may be part of an "installation package." The instructions stored on machine readable medium 920 may be useful for implementing at least part of the methods described herein.

In the context of the present example, machine readable medium 920 is encoded with a set of executable instructions 930-980. It should be understood that part or all of the executable instructions and/or electronic circuits included within one block may, in alternate implementations, be included in a different block shown in the figures or in a different block not shown.

Instructions 930, upon execution, may cause processing resource 910 to receive declarative intents indicative of a use case. In one embodiment, instructions 930 may be useful for performing block 410 of FIG. 4.

Instructions 940, upon execution, may cause processing resource 910 to generate a deployment template based on the declarative intents and a set of constraints. In one embodiment, instructions 940 may be useful for performing block 420 of FIG. 4.

Instructions 950, upon execution, may cause processing resource 910 to deploy and configure the edge site by executing the deployment template. In one embodiment, instructions 950 may be useful for performing decision block 430 of FIG. 4.

In the foregoing description, numerous details are set forth to provide an understanding of the subject matter disclosed herein. However, implementation may be practiced without some or all of these details. Other implementations may include modifications, combinations, and variations of the details discussed above. It is intended that the following claims cover such modifications, combinations, and variations.

What is claimed is:

1. A method performed by one or more processing resources of one or more computer systems, the method comprising:
    receiving declarative intents indicative of a use case for which a cluster of a container orchestration platform is to be deployed within an edge site, wherein the edge site is to be created based at least in part on infrastructure associated with a private network; and
    generating a deployment template by performing intent translation on the declarative intents and based on a set of constraints modeling a plurality of available design choices for the edge site, wherein the deployment template identifies the container orchestration platform, the container orchestration platform having been selected, according to the declarative intents and the set of constraints, by the intent translation from a plurality of supported container orchestration platforms, wherein: at least one conflict exists in the declarative intents and the set of constraints; and the method further comprises resolving, prior to the generating the deployment template, the least one conflict in the declarative intents and the set of constraints.

2. The method of claim 1, further comprising deploying and configuring the edge site by executing the deployment template.

3. The method of claim 2, wherein deploying and configuring the edge site by executing the deployment template comprises:
    causing an infrastructure provider to provision and configure the infrastructure in accordance with the deployment template;
    causing an edge cluster provider to install the container orchestration platform on the infrastructure;
    configuring the cluster within the container orchestration platform; and
    deploying at least a portion of a containerized application on the cluster in accordance with the deployment template.

4. The method of claim 1, wherein the plurality of supported container orchestration platforms include Kubernetes, Kis, or KubeEdge.

5. The method of claim 1, wherein the declarative intents include information regarding one or more of:
    a type of business for which the edge site is to be created;
    a number of servers available within the private network for the edge site;
    a containerized application;
    information relating to a type of each of a plurality of devices that will interact with the edge site;
    an indication regarding desirability of high-availability of an edge application;
    a workload estimate;
    a type of storage desired; or Quality of Service (QoS) expectations for network communication.

6. The method of claim 1, wherein the deployment template includes information regarding one or more of:
    an operating system to be installed on bare metal servers;
    a container network interface to be used by the cluster;
    a container storage interface to be used by the cluster;
    a number and a location of master nodes to support a management plane of the cluster; or
    a number of worker nodes that are to be part of the cluster.

7. The method of claim 1, wherein the intent translation generates the deployment template that satisfies the declarative intents by applying a satisfiability modulo theories (SMT)-based optimization algorithm to a plurality of predicates in first-order logic representing the set of constraints.

8. A system comprising:
    a processing resource; and
    a non-transitory computer-readable medium, storing instructions that when executed by the processing resource cause the processing resource to:
        receive declarative intents indicative of a use case for which a cluster of a container orchestration platform is to be deployed within an edge site, wherein the edge site is to be created based at least in part on infrastructure associated with a private network; and
        generate a deployment template by performing intent translation on the declarative intents and based on a set of constraints, wherein the intent translation generates the deployment template that satisfies the declarative intents by applying a satisfiability modulo theories (SMT)-based optimization algorithm to a plurality of predicates in first-order logic format modeling available design choices and representing the set of constraints.

9. The system of claim 8, wherein the infrastructure comprises a plurality of heterogeneous servers.

10. The system of claim 8, wherein the declarative intents include information regarding one or more of:
    a type of business for which for which the edge site is to be created;
    a number of servers within the private network available for the edge site;
    a containerized application;
    information relating to a type of each of a plurality of devices that will interact with the edge site;
    an indication regarding desirability of high-availability of an edge application;
    a workload estimate;
    a type of storage desired; and
    Quality of Service (QoS) expectations for network communication.

11. The system of claim 8, wherein the deployment template includes information regarding one or more of:
    the container orchestration platform selected from among a plurality of supported container orchestration platforms by the intent translation;
    an operating system to be installed on bare metal servers;
    a container network interface to be used by the cluster;
    a container storage interface to be used by the cluster;
    a number and a location of master nodes to support a management plane of the cluster; or
    a number of worker nodes that are to be part of the cluster.

12. The system of claim 8, wherein the deployment template includes specifications for the edge site at an application level, an infrastructure level, and a platform level.

13. The system of claim 8, wherein the execution of the instructions further causes the processing resource to deploy and configure the edge site in accordance with the deployment template by executing the deployment template.

14. The system of claim 8, wherein:
    at least one conflict exists in the declarative intents and the set of constraints; and
    the execution of the instructions further causes the processing resource to resolve, prior to the generating the deployment template, the least one conflict in the declarative intents and the set of constraints.

15. A non-transitory machine-readable medium storing instructions that when executed by one or more processing resources of one or more computer systems cause the one or more processing resources to:
    receive declarative intents indicative of a use case for which a cluster of a container orchestration platform is to be deployed within an edge site, wherein the edge site is to be created based at least in part on infrastructure associated with a private network; and
    generate a deployment template by performing intent translation on the declarative intents and based on a set of constraints, wherein the deployment template identifies the container orchestration platform selected by the intent translation from a plurality of supported container orchestration platforms, wherein the deployment template contains technical specifications at an infrastructure level, a platform level, and an application level.

16. The non-transitory machine-readable medium of claim 15, wherein the intent translation generates the deployment template that satisfies the declarative intents by applying a satisfiability modulo theories (SMT)-based optimization algorithm to a plurality of predicates in first-order logic format modeling available design choices and representing the set of constraints.

17. The non-transitory machine-readable medium of claim 15, wherein the declarative intents include information regarding one or more of:
    a type of business for which for which the edge site is to be created;
    a number of servers available within the private network for the edge site;
    a containerized application;
    information relating to a type of each of a plurality of devices that will interact with the edge site;
    an indication regarding desirability of high-availability of an edge application;
    a workload estimate;
    a type of storage desired; or Quality of Service (QoS) expectations for network communication.

18. The non-transitory machine-readable medium of claim 15, wherein the deployment template includes one or more of:
    information regarding the container orchestration platform selected from among a plurality of supported container orchestration platforms by the intent translation;
    an operating system to be installed on bare metal servers;
    a container network interface to be used by the cluster;
    a container storage interface to be used by the cluster;
    a number and a location of master nodes to support a management plane of the cluster; or
    a number of worker nodes that are to be part of the cluster.

19. The non-transitory machine-readable medium of claim 15, wherein execution of the instructions further cause the one or more processing resources to deploy and configure the edge site in accordance with the deployment template by executing the deployment template.

* * * * *